United States Patent
Collis et al.

(10) Patent No.: US 11,046,863 B2
(45) Date of Patent: Jun. 29, 2021

(54) FLAME-RETARDANT ACRYLONITRILE POLYMER FOR FIBRE MANUFACTURE

(71) Applicant: Metis Technologies Pty Ltd, Huntingwood (AU)

(72) Inventors: Gavin Collis, Clayton (AU); Ilias Louis Kyratzis, Clayton (AU); James Mardel, Clayton (AU); Genelle Coghlan, Blacktown (AU); Michael Gerakios, Avoca Beach (AU)

(73) Assignee: METIS TECHNOLOGIES PTY LTD, Huntingwood (AU)

( * ) Notice: Subject to any disclaimer, the term of this patent is extended or adjusted under 35 U.S.C. 154(b) by 118 days.

(21) Appl. No.: 15/999,350

(22) PCT Filed: Feb. 17, 2017

(86) PCT No.: PCT/AU2017/000046
§ 371 (c)(1),
(2) Date: Aug. 17, 2018

(87) PCT Pub. No.: WO2017/139831
PCT Pub. Date: Aug. 24, 2017

(65) Prior Publication Data
US 2019/0040276 A1    Feb. 7, 2019

(30) Foreign Application Priority Data
Feb. 19, 2016  (AU) ................................ 2016900596

(51) Int. Cl.
| C09D 133/20 | (2006.01) |
| C09D 5/14 | (2006.01) |
| C09D 5/18 | (2006.01) |
| D01F 6/18 | (2006.01) |
| D01F 11/06 | (2006.01) |
| C09K 21/14 | (2006.01) |
| C08F 120/44 | (2006.01) |
| C08K 3/00 | (2018.01) |
| C08K 3/105 | (2018.01) |
| C08K 5/24 | (2006.01) |
| C08K 5/17 | (2006.01) |

(52) U.S. Cl.
CPC .......... *C09D 133/20* (2013.01); *C08F 120/44* (2013.01); *C08K 3/00* (2013.01); *C08K 3/105* (2018.01); *C08K 5/17* (2013.01); *C08K 5/24* (2013.01); *C09D 5/14* (2013.01); *C09D 5/18* (2013.01); *C09K 21/14* (2013.01); *D01F 6/18* (2013.01); *D01F 11/06* (2013.01); *D10B 2401/04* (2013.01); *D10B 2401/13* (2013.01); *D10B 2501/02* (2013.01)

(58) Field of Classification Search
CPC .......... C09D 133/20; C09D 5/14; C09D 5/18; D01F 6/18; D01F 11/06; D10B 2401/13; D10B 2401/04; D10B 2501/02; C09K 21/14; C08F 120/44
See application file for complete search history.

(56) References Cited

U.S. PATENT DOCUMENTS 3,997,515 A   12/1976   Kosaka et al.

FOREIGN PATENT DOCUMENTS

| CN | 104594026 A | 5/2015 | |
| DE | 2712508 A1 * | 9/1978 | .............. C08L 33/20 |
| DE | 2712508 A1 | 9/1978 | |
| DE | 2724259 A1 | 12/1978 | |
| GB | 1392307 | 4/1975 | |
| JP | 5018572 C | 2/1975 | |
| JP | 284532 A | 3/1990 | |
| JP | 9158040 A | 6/1997 | |
| JP | 2010525180 A | 7/2010 | |
| JP | 2015224408 A | 12/2015 | |

OTHER PUBLICATIONS

Metis Technologies Pty Ltd, "Extended European Search Report", in connection with PCT/AU2017/000046 filed Feb. 19, 2016, 11 pages, dated Sep. 20, 2019.
Kampalanonwat et al., "Preparation and Adsorption Behavior of Aminated Electrospun Polyacrylonitrile Nanofiber Mats for Heavy Metal Ion Removal", Applied Materials & Interfaces, vol. 2, No. 12, pp. 3619-3627, 2010.
Kiani et al., "Heavy metal ion removal from aqeos solutions by functionalized polyacrylonitrile", Elsevier, Desalination 269, pp. 266-270, 2010.
El-Newehy et al., "Optimization of amine-terminated polyacrylonitrile synthesis and characterization", Arabian Journal of Chemistry, vol. 7, pp. 235-241, 2014.
Deng et al., "Aminated Polyacrylonitrile Fibers for Lead and Coper Removal", Langmuir, vol. 19, pp. 5058-5064, 2003.
Toldy et al., "Green Synthesis and Characterization of Phosphorus Flame Retardant Crosslinking Agents for Epoxy Resins", Journal of Applied Polymer Science, 9 pages, 2013.

* cited by examiner

*Primary Examiner* — Robert D Harlan
(74) *Attorney, Agent, or Firm* — McKee, Voorhees & Sease, PLC

(57) ABSTRACT

The invention relates to process for preparing a flame resistant and/or flame retardant polymer, comprising reacting an acrylonitrile polymer with an organic diamine.

22 Claims, 1 Drawing Sheet

ASTM G21 FILTER PAPER - CONTROL
1. IP1 Sample

FLAME-RETARDANT ACRYLONITRILE POLYMER FOR FIBRE MANUFACTURE

FIELD

The invention relates to acrylonitrile-based polymers which are flame resistant and/or flame retardant.

BACKGROUND

Acrylonitrile is a relatively inexpensive polymer which has found use as a fibre for manufacture of fabrics. One problem with polyacrylonitrile (PAN), as well as with many other fibres, is its flammability. PAN is known to have very poor flame retardant properties. It is a polymeric material that can be used in a variety of applications, such as textile and building materials. PAN that has been modified so as to impart flame retardant properties is very useful for the textiles industry.

A number of approaches are available to improve the flame resistance or flame retardant (FR) properties of materials. One approach is the addition of flame retarders to the material. Common flame retarders include organophosphorus and halo-organic compounds. For PAN and its derivatives a multistep synthetic process has been developed to impart a degree of flame retardancy and is used commercially today. The first step of the process involves the treatment of PAN with hydrazine hydrate. It is not fully understood what chemical transformation occurs that provides or produces the flame retardant properties of PAN, as the chemistry of the initial reaction between PAN and aqueous hydrazine is extremely complex.

In recent years, with the aim to reduce handling and use of toxic chemicals, some common flame retardant chemicals have been banned, or are being phased out and have limited use to a few countries. Halogenated polymers or chemicals used to achieve flame retardant properties have been found to accumulate in the environment and pose a health hazard and therefore are being phased out. Hydrazine hydrate is another material that is corrosive, an irritant, biologically (carcinogen, skin corrosion and sensitisation) and environmentally (aquatic) toxic, strong reducing agent and in its anhydrous form extremely explosive. Due to its hazardous nature, its use requires increased safety controls. A further disadvantage with use of hydrazine is that its use results in a pink coloration in the resulting PAN modified fibre which is difficult to conceal. This may be a disadvantage when the fibre is used for making clothing, as the resulting pink coloured clothing may be unacceptable for cultural or other reasons.

There is therefore a need for an alternative process to access flame resistant and/or flame retardant acrylonitrile-based polymers.

SUMMARY OF INVENTION

In a first aspect of the invention there is provided a process for preparing a flame resistant and/or flame retardant polymer, comprising a) reacting an acrylonitrile polymer with an organic diamine.

The following options may be used in conjunction with the first aspect, either individually or in any suitable combination.

The process may additionally comprise b) treating the polymer from step a) with a salt of a metal of Group 3 to 16. The metal may be a transition metal. It may be a metal of Group 12. It may be zinc.

The organic diamine may have structure $H_2N\text{—}R\text{—}NH_2$. In this structure, R may be an alkyl group. It may be selected from the group consisting of C1-C12 straight chain or branched alkyl groups, polyether groups, polyamine groups, di-, tri- or tetra-alkylsilane groups, dendrimers, trialkylamino groups, aromatic groups and heteroaromatic groups. R may be a dye group. It may be a flame retardant group. The organic diamine may be in aqueous solution.

The process may additionally comprise step a') treating the product of step a) with a base. If step b) is conducted, step a') may be conducted before step b). The base may be an aqueous hydroxide. The process may additionally comprise step a") treating the product of step a') with an acid. If step b) is conducted, step a") may be conducted before step b). The acid may be an aqueous mineral acid.

Step b) may comprise treating the modified polymer from step a) (or a' or a") with an aqueous solution of a metal ion salt, for example a zinc (II) salt. The aqueous solution may be acidic. Step b) may be conducted at a temperature of over 70° C.

The acrylonitrile polymer may be an acrylonitrile homopolymer. The acrylonitrile polymer may be in the form of a fibre or a plurality of fibres. It may be in the form of a textile, a fabric, a yarn or some other fibre-based substance. Textiles and fabrics may be woven or may be non-woven or may be a mixture of woven and non-woven.

In one embodiment the process comprises:
a) reacting an acrylonitrile polymer with an organic diamine;
a') treating the product of step a) with an aqueous hydroxide solution; and
a") treating the product of step a') with an aqueous mineral acid.

In this embodiment, the organic diamine may have structure $H_2N\text{—}R\text{—}NH_2$. In this formula, R may be for example a C1-C6 straight chain alkyl group.

In another embodiment the process comprises:
a) reacting an acrylonitrile polymer with an organic diamine;
a') treating the product of step a) with an aqueous hydroxide solution;
a") treating the product of step a') with an aqueous mineral acid; and
b) treating the product of step a") with a solution of a metal ion, e.g. Zn(II).

In this embodiment, the organic diamine may have structure $H_2N\text{—}R\text{—}NH_2$. In this formula, R may be for example a C1-C6 straight chain alkyl group. Step b) may be conducted at a temperature of over 70° C. It may be conducted under acidic conditions. It may be conducted at under acidic conditions at a temperature over 70° C.

The invention also encompasses a flame resistant and/or flame retardant polymer made by the process of the first aspect.

In a second aspect of the invention there is provided a flame resistant and/or flame retardant polymer comprising a reaction product of an acrylonitrile polymer with an organic diamine.

The following options may be used in conjunction with the second aspect, either individually or in any suitable combination.

The reaction product may comprise, or may be complexed with, a metal ion of Group 3 to 16.

The acrylonitrile polymer may be a homopolymer.

The organic diamine may have structure $H_2N\text{—}R\text{—}NH_2$. In this structure R may be an alkyl group. It may be selected from the group consisting of C1-C12 straight chain or branched alkyl groups, polyether groups, polyamine groups, di-, tri- or tetra-alkylsilane groups, dendrimers, trialkylamino groups, aromatic groups and heteroaromatic groups.

The flame resistant and/or flame retardant polymer may be in the form of a fibre or a plurality of fibres. It may be in the form of a textile, a fabric, a yarn or some other fibre-based substance. Textiles and fabrics may be woven or may be non-woven or may be a mixture of woven and non-woven. They may be knitted, braided or fabricated in some other manner.

The flame resistant and/or flame retardant polymer may have antimicrobial and/or antifungal properties. It may have no added antimicrobial or antifungal agent.

In an embodiment there is provided a flame resistant and/or flame retardant polymer comprising a reaction product of an acrylonitrile homopolymer with an organic diamine of structure $H_2N$—R—$NH_2$ wherein R is a C1-C6 straight chain alkyl group, and zinc ions complexed with said reaction product, said flame resistant polymer being in the form of a fibre or a plurality of fibres.

The process of the first aspect may make the polymer of the second aspect. The polymer of the second aspect may be made by the process of the first aspect.

In a third aspect of the invention there is provided a flame resistant and/or flame retardant fabric, textile or yarn comprising, or consisting of, the flame resistant and/or flame retardant polymer of the second aspect or a flame resistant and/or flame retardant polymer made by the process of the first aspect. The flame resistant and/or flame retardant polymer may be in the form of fibres from which the fabric is formed. The textile or fabric may be in the form of an item of clothing, a blanket, e.g. a fire blanket, a curtain or some other form in which flame retardancy is desirable.

The flame resistant and/or flame retardant fabric or textile may be in the form of a sock or may be in the form of an undergarment.

In a fourth aspect of the invention there is provided use of a flame resistant and/or flame retardant polymer according to the second aspect or a flame resistant and/or flame retardant polymer made by the process of the first aspect, for the manufacture of a fabric, textile or yarn. The fabric, textile or yarn may be antifungal and/or may be antimicrobial.

In a fifth aspect of the invention there is provided use of a flame resistant and/or flame retardant polymer according to the second aspect or a flame resistant and/or flame retardant polymer made by the process of the first aspect, for the manufacture of an article of clothing. The article of clothing may be antifungal and/or may be antimicrobial. It may be a sock or may be an undergarment.

BRIEF DESCRIPTION OF DRAWING

FIG. 1: Antifungal tests from Example 3.

DESCRIPTION OF EMBODIMENTS

The present invention relates to a process for making flame resistant and/or flame retardant polymers, particularly in the form of fibres, and to the polymers which may be made by the process. The process avoids the use of hydrazine, which is an extremely hazardous material, being acutely toxic, corrosive, an irritant and a suspected carcinogen.

In the process of the invention an acrylonitrile polymer is reacted with an organic diamine.

In the context of this specification, an acrylonitrile polymer may be taken to be a polymer comprising nitrile-functional monomer units. It may comprise —($CR^1R^2$—$CR^3CN$)— repeating units. $R^1$, $R^2$ and $R^3$ may independently be H, alkyl (e.g. methyl, ethyl, propyl) or aryl (e.g. phenyl). $R^1$ and $R^2$ may both be H. $R^3$ may be methyl or may be H. Important embodiments include $R^1$, $R^2$ and $R^3$ all being H, and $R^1$ and $R^2$ being H and $R^3$ being methyl. The acrylonitrile polymer may be a homopolymer or may be a copolymer (including terpolymers etc.). In the event that it is a copolymer, at least about 50% (by number) of monomer units may be nitrile-functional, e.g. may be —($CR^1R^2$—$CR^3CN$)— as described above, or at least about 60, 70, 80 or 90%. Optionally 100% of monomer unites are nitrile-functional. The copolymer may be a block copolymer or may be a random copolymer. The comonomer units may be (meth)acrylate, alkyl vinyl ether or some other type of comonomer unit. In some instances the comonomer may be a different acrylonitrile monomer (i.e. having the same general formula as set out above, but with at least one of $R^1$, $R^2$ and $R^3$ being different). In some embodiments the polymer is polyacrylonitrile (i.e. $R^1$, $R^2$ and $R^3$ are all H). In other embodiments the polymer is polymethacrylonitrile. In still other embodiments the polymer is a copolymer of acrylonitrile and methacrylonitrile. In further embodiments the polymer is an acrylonitrile-vinyl ester copolymer. Blends of different acrylonitrile polymers may also be used, as may blends of acrylonitrile polymers with other polymers.

The acrylonitrile polymer may comprise appropriate levels of suitable additives, such as flame retarders, conductivity enhancers, antioxidants, pigments, plasticisers, fillers, anti-fungal agents, antimicrobial agents, biocidal agents, antibacterial agents etc. The process may comprise the step of introducing these additives into the acrylonitrile polymer, commonly prior to reaction with the organic diamine. This may be accomplished by known methods, e.g. by dissolution of the polymer into a solvent, combining the solution with the additive and removing the solvent. In this event, the solution may be extruded into a drying chamber so as to form a fibre whilst removing the solvent. In some instances, no flame retarders are added. In some instances no anti-fungal agents, antimicrobial agents, biocidal agents or antibacterial agents are added.

Certain additives may alternatively be added after reaction with the organic diamine and optionally after any subsequent steps (e.g. complexing with a metal ion). In particular, it is thought that the introduction of organic groups in the form of the R group of the diamine may facilitate the dyeing of the product or the incorporation into the product of other functional molecules. In some instances the R group comprises a functional group capable of covalent binding, or otherwise bonding, to a dye molecule to improve the adherence of the dye to the product, or to some other molecule, e.g. a flame retardant, to improve a property of the polymer.

Thus various additives may be present, as discussed above, and may be covalently bonded to the polymer or may be simply blended with the polymer. They may be retained, for example, due to dipolar or other interactions with the polymer or with some other species present in the polymer (e.g. filler particles).

In the present specification, the term "about" may signify a range of +/−10% about the stated value unless the context indicates otherwise.

The acrylonitrile polymer may have Mn of between about 1000 and about 1000000, or between about 1000 and about 100000, 1000 and 10000, 10000 and 1000000, 100000 and 1000000 or 10000 and 100000, e.g. about 1000, 2000, 5000, 10000, 20000, 50000, 100000, 200000, 500000 or 1000000.

It may have a narrow molecular weight distribution or may have a broad molecular weight distribution. It may have Mw/Mn of less than about 2, or less than about 1.5, 1.4, 1.3, 1.2 or 1.1, or greater than about 1.3, or greater than about 1.4, 1.5, 1.6, 1.7, 1.8, 1.9 or 2. It may have Mw/Mn of about 1.05, 1.1, 1.2, 1.3, 1.4, 1.5, 1.6, 1.7, 1.8, 1.9 or 2, or greater than about 2.

In the context of the present invention an organic diamine is a compound having at least two amine groups attached to an organic group. The organic diamine may have only two amine groups, or may have 3, 4, 5 or more than 5 amine groups. Each amine group may independently be either primary or secondary. The organic diamine may also comprise tertiary amine groups, provided that it contains at least two amine groups which are either primary or secondary. In some embodiments the organic diamine comprises two primary amine groups. In other embodiments it comprises more than two primary amine groups, e.g. 3, 4 or 5. In other embodiments the organic diamine comprises two or more amine groups, each being either primary or secondary. For example the organic diamine may be bis(2-aminoethyl) amine, N,N'-bis(2-aminoethyl)-1,2-diaminoethane or some other polyamine. The organic diamine may have structure $H_2N$—R—$NH_2$. In this structure R may be an alkyl group, or may be an aryl group, or may be a heteroaryl group. It may comprise more than one of these structures, e.g. it may comprise alkyl and aryl groups (e.g. (4-(aminomethyl)phenyl)methylamine: p-xylylenediamine). In some embodiments both $NH_2$ groups are attached to an alkyl group. The alkyl group may be straight chain or may be branched or may be cyclic or may have more than one of these structures (e.g. an aminoalkylcyclohexylamine). In some embodiments both of the $NH_2$ groups are attached to $CH_2$ groups. The organic diamine may for example be an α,ω-diaminoalkane, e.g. ethylene diamine, propane-1,3-diamine, butane-1,4-diamine etc. Other suitable R groups include ethers, diethers and polyethers (e.g. $((CH_2CH_2)O)_n(CH_2CH_2)$, where n=1, 2, 3, 4, 5 or more than 5), polythioethers (e.g. $((CH_2CH_2)S)_n(CH_2CH_2)$, where n=1, 2, 3, 4, 5 or more than 5), polyamines (e.g. $(CH_2CH_2)NX)_n(CH_2CH_2)$, in which each X independently is H or alkyl or aryl or some other suitable group and n=1, 2, 3, 4, 5 or more than 5), silanes (e.g. $(CH_2CH_2)SiX_2)_n(CH_2CH_2)$, in which each X independently is H or alkyl or aryl or some other suitable group and n=1, 2, 3, 4, 5 or more than 5). R may be, or may comprise, a dye group, i.e. a group capable absorbing light in the visible range (400-700 nm wavelength) so as to confer a desired colour on the product. R may be selected to have the desired colour. In other instances R may be selected to be flame resistant or flame retardant. It may for example be a trialkylphosphine, trialkylphosphite, trialkylphosphate, trialkylphosphonate, tri alkylphosphoramide, hexaalkylcyclotripolyphosphazine or some other phosphorus-containing group, e.g. the above phosphorus-containing groups in which alkyl is replace by aryl (e.g. phenyl). Suitable flame resistant diamines include O=$P(XCH_2CH_2NH_2)_3$, where X=O or NH, and O=$P(XArNH_2)_3$, where X=O or NH and Ar is o-, m- or p-phenyl. R may be a dendrimer, a hyperbranched polymer or a star polymer in which the amine groups of the diamine are at outer or terminal points of the polymer or dendrimer. It will be understood that mixtures of more than one diamine as described above may also be used.

In reacting the acrylonitrile polymer with the organic diamine, the polymer is commonly in the solid phase. The organic diamine is commonly in solution, commonly aqueous solution. The solvent in the aqueous solution may be water without any organic solvent or may be water mixed with a water miscible solvent, e.g. methanol, ethanol, isopropanol, acetone, dimethylsulfoxide (DMSO), dimethylformamide (DMF), dimethylacetamide (DMA), hexamethylphosphorus triamine, hexamethylphosphorus triamide etc. The presence of an organic solvent may improve compatibility of the solution with polymer. In some embodiments the polymer may also be in solution. The organic solvent may represent less than 50% of the total solvent, or less than about 40, 30, 20 or 10%, the remainder being aqueous. In this event the solvent for the polymer may be one which will also dissolve the diamine, or which is miscible with a solvent for the diamine. For example the polymer may be dissolved in DMSO, DMF, DMA etc. and the diamine may also be dissolved in one of these solvents or in water. In some embodiments the reaction may be conducted in the absence of water, or in a solvent or solvent mixture which contains less than about 5% water, or less than about 1% water. In some embodiments the organic diamine is not provided in solution. This may be the case where, at the temperature of the reaction, the organic diamine is a liquid. However in some instances the organic diamine may be provided neat and reacted with a solution of the polymer, whereby the organic diamine dissolves in the polymer solution.

In the event that the polymer is in solid form, it may be in the form of fibres. The fibres may be short fibres (e.g. from about 1 mm to about 1 cm in length) or may be in the form of long fibres (e.g. from about 1 cm to about 1 m in length or longer). The diameter of the fibre may be from about 5 to about 500 microns, or from about 5 to 100, 5 to 20, 10 to 500, 50 to 500, 100 to 500, 10 to 100, 10 to 50 or 50 to 100 microns, e.g. about 5, 10, 15, 20, 25, 30, 35, 40, 45, 50, 60, 70, 80, 90, 100, 150, 200, 250, 300, 350, 400, 450 or 500 microns. The small fibre diameter may facilitate penetration of the organic diamine into the polymer so as to react the polymer throughout its thickness. In the event that the fibre is thicker, the reaction may not occur throughout the fibre. In such cases, the resulting fibre may have a sheath of treated polymer surrounding a core of untreated or partially treated polymer. In such cases, the sheath of treated fibre may still provide flame retardancy and/or flame resistance, and optionally also antifungal or antimicrobial performance. The fibres may be in the form of a fabric, textile or yarn. The textile or fabric may be in the form of an item of clothing, e.g. a sock or an undergarment or an overgarment, a blanket, e.g. a fire blanket, a curtain, a fibrous mat, a rug, a carpet or some other form in which flame retardancy and/or antimicrobial or antifungal activity is desirable.

In the event that the organic diamine is in solution, it may have a concentration of from about 1 to about 50% w/v, or about 1 to 5, 1 to 20, 5 to 50, 10 to 50, 20 to 50, 5 to 20, 5 to 10 or 10 to 20%, e.g. about 1, 5, 10, 15, 20, 25, 30, 35, 40, 45 or 50% w/v. However higher concentrations may be used, e.g. about 55, 60, 65 or 70%. Step a) may be conducted at room temperature or may be conducted at elevated temperature. It may in some instances be conducted at reflux temperature. It may be conducted at a temperature of from about 20 to about 120° C., or from about 30 to 120, 50 to 120, 70 to 120, 100 to 120, 20 to 100, 20 to 50, 50 to 100 or 80 to 100° C., e.g. at about 20, 30, 40, 50, 60, 70, 80, 90, 100, 110 or 120° C. In some instances, it may be conducted at higher temperatures, e.g. 130, 140 or 150° C. If the normal boiling point of the organic diamine or its solvent is below the desired reaction temperature, step a) may be conducted at elevated pressure. It may be conducted within a sealed pressure vessel. It will be understood that the lower the temperature, the longer the required reaction time. The temperature will also depend on the nature of the solvent, and the pressure at which the reaction is conducted. Commonly step a) will be conducted for a period of from about 3 to about 48 hours, or about 6 to 48, 12 to 48, 24 to 48, 36 to 48, 3 to 24, 3 to 12, 12 to 24, 6 to 24 or 12 to 36 hours, e.g. for about 6, 12, 18, 24, 30, 36, 42 or 48 hours. In some instances it may be conducted for even longer, e.g. up to about 60 hours. The reaction may be conducted under an ambient atmosphere, i.e. normal air, or may be conducted under an inert atmosphere, e.g. nitrogen, helium, argon or a combination of these gases.

Once step a) has been completed, the polymer may be washed, e.g. with water, so as to remove excess organic diamine. It may be washed once, or more than once, e.g. 2, 3, 4 or 5 times. The water may be at any suitable temperature between about 20 and about 100° C.

The reaction product of the acrylonitrile polymer and the organic diamine may be complexed with a metal ion. In the present context, the term "complexed" is used merely to indicate that the metal ions are bound to the polymer and do not readily wash out. The term should not be taken to imply any particular electronic structure or nature of the binding. This step involves treatment with a salt of the metal. The metal may be a Group 3 to Group 16 metal. It may be a Group 10 to Group 12 metal. It may be a Group 10 metal or a Group 11 metal or a Group 12 metal. It may be for example any one of Fe, Co, Ni, Cu, Zn, Ru, Rh, Pd, Ag or Cd. It may be a Group 13 or a Group 14 metal, e.g. Al, Ga, In, Sn or Pb. Mixtures of suitable metals may also be used. The metal may be in its +2 or +3 ionic form or in some other valency form. It is thought that complexation with the metal ion serves to further improve the flame resistance and/or flame retardancy. It is also hypothesised that the presence of the metal ion may contribute to antimicrobial and/or antifungal activity.

Step b) is commonly conducted using a divalent metal salt, e.g. zinc (II) salt. Any suitable counterion may be used provided that an appropriate concentration of the salt in the solvent may be achieved. Suitable counterions include acetate, halide (e.g. chloride, bromide) and sulfate although generally halides are generally not preferred due to the possibility of residual halide in the product. The metal salt may be in solution at a concentration of from about 5 to about 20% w/v, or about 5 to 10, 10 to 20 or 7 to 12%, e.g. about 5, 6, 7, 7.5, 8, 9, 10, 15 or 20% w/v. The metal salt solution may be acidic. It may have a pH of from about 2 to about 5, or from about 2 to 4, 2 to 3, 3 to 5, 4 to 5 or 3 to 5, e.g. about 2, 2.5, 3, 3.5, 4, 4.5 or 5. It may comprise an acid. The acid may be an organic acid, e.g. acetic acid or propionic acid. It may be present at a concentration of about 10 to about 50% w/v in the solution, or about 10 to 40, 10 to 30, 10 to 20, 20 to 50, 20 to 40, 20 to 30 or 30 to 40%, e.g. about 10, 15, 20, 25, 30, 35, 40, 45 or 50% w/v. The acid may be one that can bind to the metal ion. It may be a weak acid. It may be a buffering acid. It may have a pKa of about 3 to about 6, or about 3 to 5, 3 to 4, 4 to 6, 5 to 6 or 4 to 5, e.g. about 3, 3.5, 4, 4.5, 5, 5.5 or 6. In some instances the metal salt solution may be basic. It may have a pH of from about 9 to about 12, or about 9 to 11, 9 to 10, 10 to 12, 11 to 12 or 10 to 11, e.g. about 9, 9.5, 10, 10.5, 11, 11.5 or 12. Step b) may be conducted at any suitable temperature. It may be conducted at reflux. It may be conducted between about 80 and about 110° C., or about 80 to 100 or 90 and 100° C., e.g. at about 80, 90, 100 or 110° C. It may be conducted from about 0.5 to about 5 hours, or about 0.5 to 2, 0.5 to 1 or 1 to 2 hours, e.g. 0.5, 1, 1.5, 2, 2.5, 3, 3.5, 4, 4.5 or 5 hours. It will be understood that the lower the temperature, the longer the required reaction time.

In some embodiments of the invention, the product of the initial treatment of the acrylonitrile polymer with the organic diamine is treated with base and optionally acid treatments before the subsequent treatment with metal salt. The base is commonly an inorganic base, such as hydroxide. Suitable examples include sodium hydroxide and potassium hydroxide. The base may be used in solution, commonly aqueous solution. The concentration of the base may be from about 2 to about 20% w/v, or about 2 to 10, 2 to 5, 5 to 20, 10 to 20 or 5 to 10%, e.g. about 2, 3, 4, 5, 6, 7, 8, 10, 15 or 20%. The solution may have a pH of greater than about 8, or from about 8 to 14, or 10 to 14 or 12 to 14, e.g. about 8, 9, 10, 11, 12, 13 or 14 or may be greater than 14. This step may be conducted at elevated temperature or at ambient temperature. Suitable elevated temperatures are from about 50 to about 100° C., or about 70 to 100, 90 to 100, 50 to 90, 50 to 70 or 70 to 90° C., e.g. about 50, 60, 70, 80, 90 or 100° C., however higher temperatures may be used. The pressure may be between about 1 and about 3 atmospheres, or about 1 to 2, 2 to 3 or 1.5 to 2.5 atmospheres, e.g. about 1, 1.5, 2, 2.5 or 3 atmospheres. The reaction may be conducted in a sealed pressure vessel in order to achieve the higher pressure. This step commonly takes about 1 to about 3 hours, or about 1 to 2, 2 to 3 or 1.5 to 2.5 hours, e.g. about 1, 1.5, 2, 2.5 or 3 hours, or in some instances longer than 3 hours. It will be understood that the lower the temperature, the longer the required time in general.

Following the base treatment described above, the polymer may be washed so as to remove excess base. It may be washed with water. It may be washed once, or more than once, e.g. 2, 3, 4 or 5 times. The water may be at any suitable temperature between about 20 and about 100° C.

The polymer may then be treated with acid. The acid may be a strong acid (e.g. pKa less than about 1, or less than about 0.5 or 0.2). It may be a mineral acid, e.g. sulfuric, hydrochloric or phosphoric acid. It may be used at a concentration of from about 5 to about 10% w/v, or about 5 to 7, 7 to 10 or 6 to 8%, e.g. about 5, 6, 7, 8, 9 or 10%. This step may be conducted at elevated temperature or at ambient temperature. Suitable temperatures are from about 50 to about 100° C., or about 70 to 100, 90 to 100, 50 to 90, 50 to 70 or 70 to 90° C., e.g. about 50, 60, 70, 80, 90 or 100° C. In some instances, higher temperatures may be used. This may be accompanied by elevated pressures. Thus temperatures of about 100 to about 130° C. may be used, or about 100 to 120, 100 to 110, 110 to 130, 120 to 130 or 110 to 120° C., e.g. about 110, 120 or 130° C. This step commonly takes about 0.5 to about 2 hours, or about 0.5 to 1, 1 to 2 or 1 to 1.5 hours, e.g. about 0.5, 1, 1.5 or 2 hours. It will be understood that the lower the temperature, the longer the required reaction time in general. Also higher acid concentrations will generally require shorter times.

Following the acid treatment described above, the polymer may be washed so as to remove excess acid. It may be washed with water. It may be washed once, or more than once, e.g. 2, 3, 4 or 5 times. The water may be at any suitable temperature between about 20 and about 100° C. Step b) as described above may then be subsequently conducted.

Any or all of the above treatment steps (i.e. organic diamine treatment, zinc salt treatment and, if conducted, base treatment and acid treatment) may be conducted at ambient pressure (i.e. approximately 1 atmosphere) or may be conducted at elevated pressure, e.g. up to about 2, 3, 5 or 10 atmospheres, or about 1 to about 10 atmospheres or about 1 to 3, 1 to 5, 5 to 10 or 2 to 5 atmospheres, e.g. about 1, 1.5, 2, 2.5, 3, 3.5, 4, 4.5, 5, 6, 7, 8, 9 or 10 atmospheres. The reactions may be conducted in a sealed reaction vessel and allowed to reach the appropriate equilibrium pressure dictated by the nature of the solvent(s) present and the temperature.

The flame resistant and/or flame retardant polymer produced by the process of the present invention is commonly in the form of a fibre or plurality thereof. The fibre(s) may be in the form of a textile or fibre, either woven or nonwoven, or a mixture of the two. The physical dimensions of the fibre may be the same, or similar (e.g. within about 10% for each dimension), to those of the starting fibrous acrylonitrile polymer as described earlier. The polymer may be flame resistant. It may be non-combustible. It may be flame retardant. It may be capable of being located within a flame in air for at least about 60 seconds in ambient air without catching alight. It may have a zinc content (as measured by XPS (X-ray photoelectron spectroscopy) or by ICP-OES (inductively coupled plasma optical emission spectrometry)) of at least about 3%, or at least about 4, 5, 6, 7 or 8%, or about 3 to about 12%, or about 3 to 10, 3 to 8, 3 to 5, 5 to 12, 8 to 12 or 5 to 8%, e.g. about 3, 4, 5, 6, 7, 8, 9, 10, 11 or 12%. In some instances it may be even more, e.g. up to about 15 or 20%. These percentages may be on a w/w basis. It may have a higher oxygen content than the original acrylonitrile polymer. It may have an oxygen content of about 10 to about 25%, or about 10 to 20, 10 to 15, 15 to 25, 20 to 25 or 15 to 20%, e.g. about 10, 12, 15, 18, 20, 22 or 25% on a w/w basis. The polymer may have no detectable nitrile groups. It may have no nitrile groups detectable by IR spectroscopy. It may have no detectable IR absorption between about 2200 and about 2300 cm$^{-1}$. It may have a limiting oxygen index (LOI) greater than that of acrylonitrile. This feature may be used to define a polymer as being "flame resistant and/or flame retardant". It may have LOI at least 1% greater than that of acrylonitrile, or at least 2, 3, 4 or 5% greater (where for example LOI of 40% is taken to be 5% higher than LOI of 35%). It may have LOI of at least 40%, or at least 41, 42, 43, 44 or 45%. In some applications lower LOI may be acceptable, e.g. about 25 to about 30% or about 30 to about 40%, or about 30 to 35, 35 to 40 or 38 to 40, e.g. about 25, 26, 28, 30, 32, 34, 36, 38 or 40%. LOI refers to the minimum concentration (V/V) of oxygen in an oxygen enriched atmosphere in which the material will sustain combustion or a source of ignition. It may be tested according to ASTM G21-96 (reapproved 2002) or ISO 4589-3:1996.

The flame resistant and/or flame retardant polymer may contain no detectable levels of hydrazine. It may contain less than about 1 ppm hydrazine on a w/w basis, or less than about 100 ppb, or less than about 10 ppb or less than about 1 ppb hydrazine on a w/w basis.

The flame resistant and/or flame retardant polymer may comprise one or more additives, which may include flame retarders, conductivity enhancers, antioxidants, pigments, plasticisers, fillers, antimicrobial agents, antifungal agents etc. in order to improve its properties (relative to the product without the additive). Suitable flame retarders are well known to those skilled in the art and may be additional to any bonded flame retarder (e.g. part of the diamine reagent) present. Similarly, suitable antioxidants, pigments, plasticisers and fillers are well known. The product may for example contain nanoparticles (e.g. zinc oxide, silicates, clays etc.) as flame retardants. The nanoparticles may be inorganic nanoparticles. They may be metal oxide nanoparticles. A suitable conductivity enhancer is graphene, however other materials such as carbon nanotubes, metallic particles, phthalocyanins and mixtures of such materials may also be used. Such additives improve the electrical conductivity of the product and therefore inhibit the accumulation of static charge. This can be important for example when the product is used in a clothing fabric. Accumulation of charge can lead to sparking which can initiate combustion, either of the fabric itself or of flammable gases in the vicinity of the fabric. Thus conductivity enhancers can reduce the risk of such combustion.

The product of the invention may be in other forms than fibres. For example it may be in particulate form e.g. nanoparticles. The particles may be substantially spherical, or may be irregular shaped or acicular or may be some other suitable shape. The product may be in the form of a solid surface. In this case the substrate below the surface may be the same polymer or may be some other polymer. For example if the process described herein is applied to a bulk acrylonitrile polymer, the treatment may penetrate only partially through the polymer. In this case the subsurface material may be the original acrylonitrile polymer and the surface material (e.g. the top 1, 2, 3, 4, 5, 10, 15, 20, 25, 30, 35, 40, 45, 50, 60, 70, 80, 90, 100 or more than 100 microns) may be treated as described herein so as to be flame resistant and/or flame retardant, and/or antimicrobial and/or antifungal. The product may be in the form of a porous solid. It may be in the form of a foam, e.g. a closed cell foam or an open cell foam. It may be in some other form.

It will be readily appreciated that there are many uses for the product of the present invention. In fibre form, the material may be made into fabrics, for example for flame resistant clothing. It may be used as a non-flammable fibrous filler for composite materials, e.g. polymer composites, which may be used in construction applications. It may be used as an antifungal or antimicrobial fabric, e.g. for socks or undergarments where proliferation of fungi and/or other microbes may be a problem. Other suitable applications will be readily apparent.

The fibre of the invention, or made by the process of the invention, and hence fabric made from such fibre, may be a non-pink colour. It is commonly a pale colour. It may be white, off-white, pale brown, pale beige, pale yellow or some similar colour. As discussed earlier, the colour which arises inherently from the treatment may be modified by addition of suitable dyes to the fibre and/or fabric, either during or after manufacture, or by covalent binding of dye molecules to the fibre by incorporation into or bonding to the organic diamine. It is thought that dyeing of the fibres of the present invention is more readily achieved than for fibres made by treatment of polyacrylonitrile with hydrazine, since the organic moiety of the organic diamine, which is incorporated into the resulting flame resistant and/or flame retardant polymer, can bind non-covalently with dye molecules, e.g. by way of van der Waals forces or hydrophobic-hydrophobic interactions.

The fibre of the invention, or a fabric or article of clothing made therefrom or comprising said fibre, may be antifungal. It may be antimicrobial, e.g. antibacterial. It may resist the growth of one or more, optionally all, of fungi, mould, bacteria and/or other microorganisms on a surface thereof. It has surprisingly been found that in some embodiments the fibres of the present invention have intrinsic antifungal and/or antibacterial properties, even without the incorporation of added antimicrobial or antifungal agents. In this context "intrinsic" indicates that the property is obtained in the absence of any added antimicrobial or antifungal agents. It will be understood that "added antimicrobial or antifungal agents" exclude the added metal (e.g. zinc) salt and the organic diamine, which may themselves have antimicrobial or antifungal properties. In some instances, however, added antimicrobial or antifungal substances may also be separately added. These are well known in the art.

The fibre, or a fabric or article of clothing made therefrom or comprising said fibre, may be antifungal as tested by ASTM G21-96 (Reapproved 2002). It may be antifungal to the extent that a sock made from said fibre can be worn for 12 hours per day for at least 1 week, or at least 2, 3, 4, 5 or 6 weeks, without developing an unpleasant odour. It may be antifungal to the extent that a fabric made from said fibre, when innoculated with *Aspergillus niger* and incubated at 25° C. and 50% RH, does not support growth of the *A. niger* after 1 week and optionally causes a reduction in the *A. niger* after 1 week.

EXAMPLES

Example 1: Ethylene Diamine Treated Fibres

PAN fibre (1 g) was treated with a solution of ethylene diamine (4.02 g) and water (21.5 mL) that was gently stirred in a glass vessel. This mixture was then heated at 110° C. at ambient pressure for 48 hours before cooling. The ethylene diamine-PAN fibre was filtered and washed with water (400 mL). This material was then dried between paper toweling to remove residual solvent before use in the next step.

The ethylene diamine-PAN treated fibre from the previous step was placed in a glass vessel and treated with sodium hydroxide (6 g) and water (100 mL). This mixture was heated at 90° C. at ambient pressure for 2 hours. After this period the reaction mixture was cooled, the material collected and washed with water (300 mL). This NaOH-PAN material was then dried between paper toweling to remove residual solvent before use in the next step.

The NaOH-PAN treated material from the previous step was placed in a glass vessel and treated with concentrated sulfuric acid (7 g) and water (100 mL). This mixture was heated at 70° C. at ambient pressure for 1 hour. After this period the reaction mixture was cooled, the material collected and washed with water (300 mL). This $H_2SO_4$-PAN material was then dried between paper toweling to remove residual solvent before use in the next step.

The $H_2SO_4$-PAN treated material from the previous step was placed in a glass vessel and treated with zinc acetate dihydrate (7.5 g), glacial acetic acid (30 mL) and water (70 mL). This mixture was heated at 100° C. at ambient pressure for 1 hour. After this period the reaction mixture was cooled, the material collected and washed with water (300 mL). This final material was then dried between paper toweling to remove residual solvent (Table 1).

Example 2: Aqueous Hydrazine Treated Fibres

The method described in Example 1 was used to prepare treated PAN fibre on a larger scale (~50 gram) in a Roaches Colourtec® reactor, then converted to non-woven PAN to obtain suitable quantities of material for flame retardant tests (Table 2)

Comparative Example

PAN fibre (1 g) was treated with a solution of 50-60% hydrazine hydrate (3.9 g) and water (22 mL) that was gently stirred in a glass vessel. This mixture was then heated at 110° C. at ambient pressure for 48 hours before cooling. The hydrazine-PAN fibre was filtered and washed with water (400 mL). This material was then dried between paper toweling to remove residual water before use in the next step.

It was observed that the time could be reduced to 24 hrs or lower with better circulation and if pressurised. In one run using non-woven PAN at twice the loading the reaction was run for 18 hours.

The hydrazine-PAN treated fibre from the previous step was placed in a glass vessel and treated with sodium hydroxide (6 g) and water (100 mL). This mixture was heated at 90° C. at ambient pressure for 2 hours. After this period the reaction mixture was cooled, the material collected and washed with water (300 mL). This NaOH-PAN material was then dried between paper toweling to remove residual water before use in the next step.

The NaOH-PAN treated material from the previous step was placed in a glass vessel and treated with concentrated sulfuric acid (7 g) and water (100 mL). This mixture was heated at 70° C. at ambient pressure for 1 hour. After this period the reaction mixture was cooled, the material collected and washed with water (300 mL). This $H_2SO_4$-PAN material was then dried between paper toweling to remove residual water before use in the next step.

The $H_2SO_4$-PAN treated material from the previous step was placed in a glass vessel and treated with zinc acetate dihydrate (7.5 g), glacial acetic acid (30 mL) and water (70 mL), pH about 2-3. This mixture was heated at 100° C. at ambient pressure for 1 hour. After this period the reaction mixture was cooled, the material collected and washed with water (300 mL). This final material was then dried between paper toweling to remove residual water (Table 1).

Results

TABLE 1

Colour coordinates of non-treated and chemical treated PAN fibre*

| Material | Visual inspection by eye | Colour Co-ordinates | | |
|---|---|---|---|---|
| | | L | a | b |
| PAN fibre | white | 84.68 | −0.95 | 3.40 |
| Hydrazine treated PAN fibre | pink | 67.65 | 14.54 | 6.78 |
| Ethylene diamine treated PAN fibre | light yellow | 76.29 | −0.68 | 17.59 |

*A Gretag MacBeth Coloureye 7000A spectrophotometer was used where L, a and b are defined according to (http://dba.med.sc.edu/price/irf/Adobe_tg/models/cielab.html) as L is the lightness or total reflection value, a is defined as the Red-Green axis and b is defined as the Yellow-Blue axis.

TABLE 2

Flame tests on non-treated and chemical treated PAN non-woven

| Material* | Limited Oxygen Index (LOI) value |
|---|---|
| PAN | 17 |
| Hydrazine treated PAN | >25 |
| Ethylene diamine treated PAN | >25 |

Example 3: Fungal Resistance

Objectives:
To determine dry film fungal resistance (anti-mould resistance) of fabric sample.
Conclusions:
The dry film fungal challenge test results in Table 1 indicate that the IP1 sample (test sample: see below) was resistant to surface fungal growth.

FIG. 1 shows THOR Filter paper control showed heavy growth, whereas the IP1 sample had no growth.

Samples:

The testing was done in triplicate and the results were all similar, however only one picture was taken of each sample for inclusion in this report.

Sample Description

IP1 is a sample of fibre treated as described above. No additions were made to the sample prior to testing.

Test Method:

Dry Film fungal resistance test ASTM G21-96 (Reapproved 2002)

Results:

Dry Film Fungal Resistance Test—Growth rating after 28 days

| Sample | | Samples | | |
|---|---|---|---|---|
| | | Sample 1 | Sample 2 | Sample 3 |
| 1 | IP1 | 0 | 0 | 0 |
| 2 | Filter Paper control | 4 | 4 | 4 |

Key to Growth Rating:
0=no growth
1=Traces of growth (less than 10%)
2=Light growth (10-30% coverage of growth)
3=Medium Growth (30-60% coverage of growth)
4=Heavy Growth (60% to complete)

A rating of trace or no growth (one or less) is confirmed by microscopic observation.

Dry Film Test Methods

ASTM G21-96 (Reapproved 2002)
Determining Resistance of Synthetic Polymeric Materials to Fungi Each test sample was placed on nutrient-salts agar and tested in triplicate as per the standard. All samples were spray inoculated with the mixed fungal spore suspension. The inoculated samples were then incubated at 30° C. for 28 days. Resultant fungal growth was visually/microscopically assessed and rated accordingly.

A rating of trace or no growth (one or less) is confirmed by microscopic observation.

All test specimens showed a growth rating less than 1 and were examined microscopically at a magnification of 65× to confirm there was no growth.

The filter paper (viability) control gave a growth rating of 4 indicating the test was valid.

*Aspergillus niger* ATCC 9642
*Gliocladium virens* ATCC 9645
*Aureobasidium pullulans* ATCC 15233
*Chaetomium globosum* ATCC 6205
*Penicillium funiculosum* ATCC 9644

The invention claimed is:

1. A process for preparing a flame resistant and/or flame retardant polymer, comprising:
   a) reacting an acrylonitrile polymer with an organic diamine;
   a') treating the product of step a) with a base; and
   a") treating the product of step a') with an acid.

2. The process of claim 1 additionally comprising
   b) treating the polymer with a salt of a Group 3 to 16 metal after step a").

3. The process of claim 2 wherein the metal is zinc.

4. The process of claim 3 wherein step b) comprises treating the polymer with an aqueous solution of a zinc (II) salt.

5. The process of claim 4 wherein the aqueous solution is acidic.

6. The process of claim 2 wherein step b) is conducted at a temperature of over 70° C.

7. The process of claim 1 wherein the organic diamine has structure $H_2N$—R—$NH_2$, wherein R is selected from the group consisting of C1-C12 straight chain or branched alkyl groups, polyether groups, polyamine groups, di-, tri- or tetra-alkylsilane groups, dendrimers, trialkylamino groups, aromatic groups and heteroaromatic groups.

8. The process of claim 1 wherein the organic diamine is in aqueous solution.

9. The process of claim 1 wherein the base is an aqueous hydroxide.

10. The process of claim 1 wherein the acid is an aqueous mineral acid.

11. The process of claim 1 wherein the acrylonitrile polymer is an acrylonitrile homopolymer.

12. The process of claim 1 comprising:
   a) reacting polyacrylonitrile with an organic diamine;
   a') treating the product of step a) with an aqueous hydroxide solution;
   a") treating the product of step a') with an aqueous mineral acid; and
   b) treating the product of step a") with an acidic solution of a metal ion.

13. The process of claim 12 wherein the organic diamine has structure $H_2N$—R—$NH_2$, wherein R is selected from the group consisting of C1-C12 straight chain or branched alkyl groups.

14. The process of claim 12 wherein the metal ion is Zn(II).

15. A flame resistant and/or flame retardant polymer comprising a reaction product of an acrylonitrile polymer with an organic diamine, and zinc ions complexed with said reaction product.

16. The flame resistant and/or flame retardant polymer of claim 15 wherein the acrylonitrile polymer is a homopolymer.

17. The flame resistant and/or flame retardant polymer of claim 15 wherein the organic diamine has structure $H_2N$—R—$NH_2$, wherein R is selected from the group consisting of C1-C12 straight chain or branched alkyl groups, polyether groups, polyamine groups, di-, tri- or tetra-alkylsilane groups, dendrimers, trialkylamino groups, aromatic groups and heteroaromatic groups.

18. The flame resistant and/or flame retardant polymer of claim 15 in the form of a fibre or a plurality of fibres.

19. The flame resistant and/or flame retardant polymer of claim 15 which has antimicrobial and/or antifungal properties.

20. The flame resistant and/or flame retardant polymer of claim 19 which has no added antimicrobial or antifungal agent.

21. A flame resistant and/or flame retardant fabric comprising the flame resistant and/or flame retardant polymer of claim 15.

22. The flame resistant and/or flame retardant fabric of claim 2 in the form of a sock or an undergarment.

* * * * *